Nov. 6, 1962     H. H. HOLLY     3,061,872
MOLDING DEVICE

Filed March 31, 1959     8 Sheets-Sheet 1

Inventor:
Harry H. Holly,
By Hofgren, Brady, Wegner,
Allen, Stellman, Attys.

Nov. 6, 1962

H. H. HOLLY 3,061,872

MOLDING DEVICE

Filed March 31, 1959

Inventor:
Harry H. Holly,
By Hofgren, Brady, Wegner,
Allen & Stellman, Attys.

Nov. 6, 1962 H. H. HOLLY 3,061,872
MOLDING DEVICE
Filed March 31, 1959 8 Sheets-Sheet 6
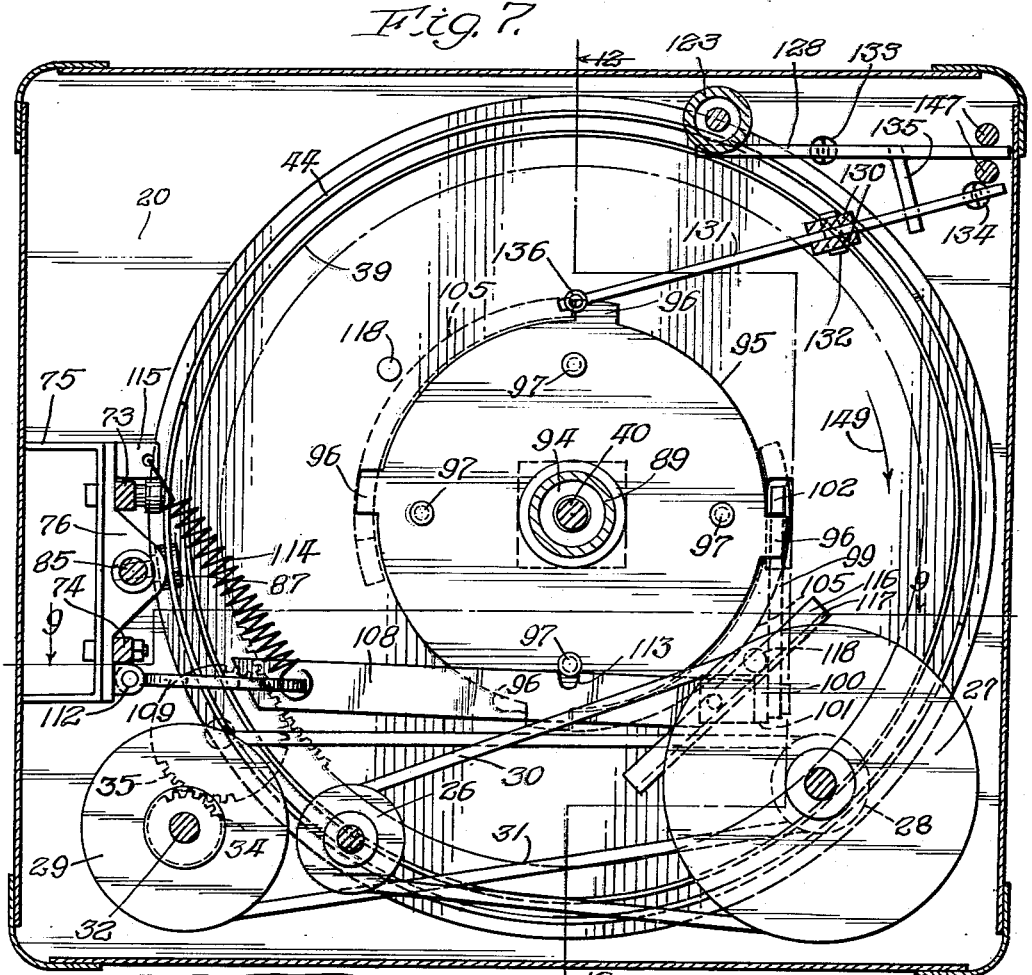
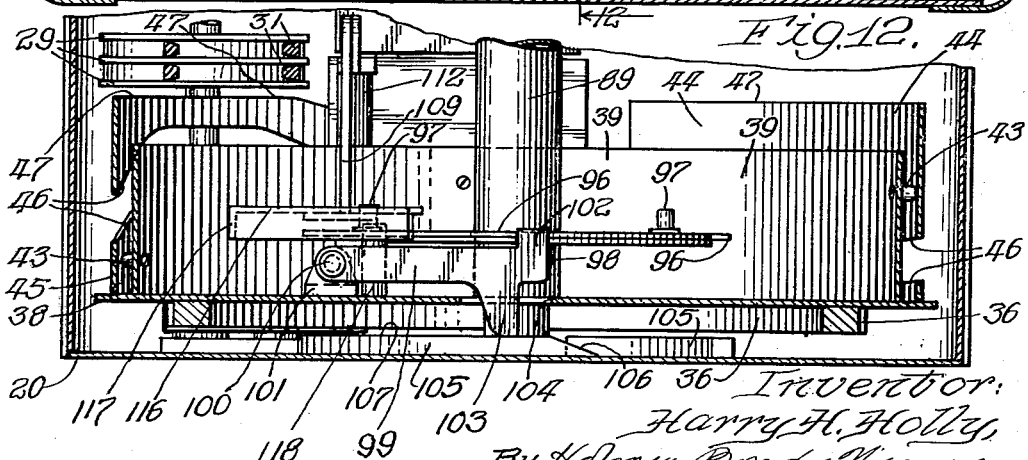

Nov. 6, 1962 H. H. HOLLY 3,061,872
MOLDING DEVICE
Filed March 31, 1959 8 Sheets-Sheet 8
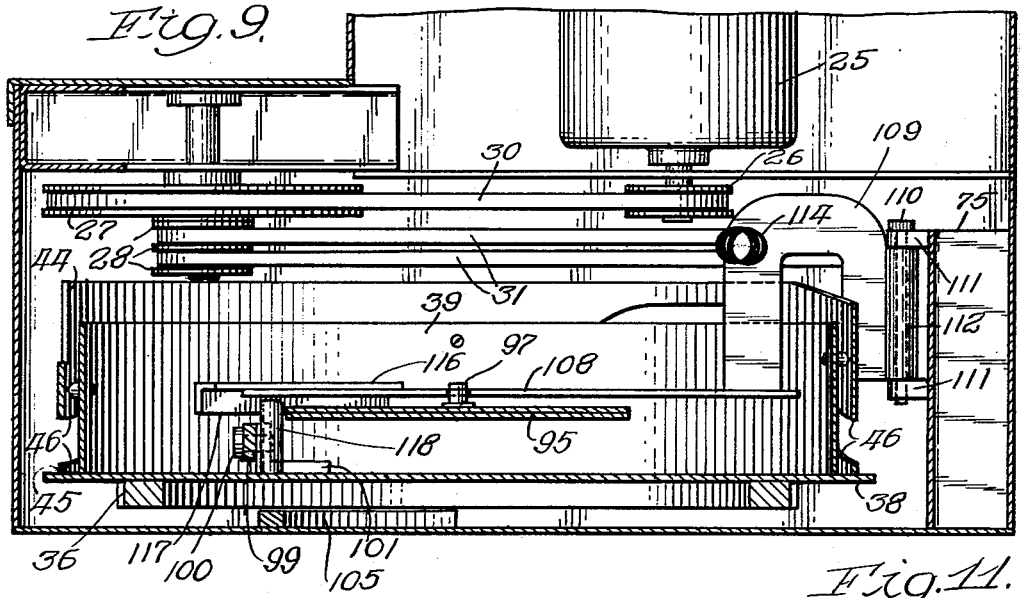
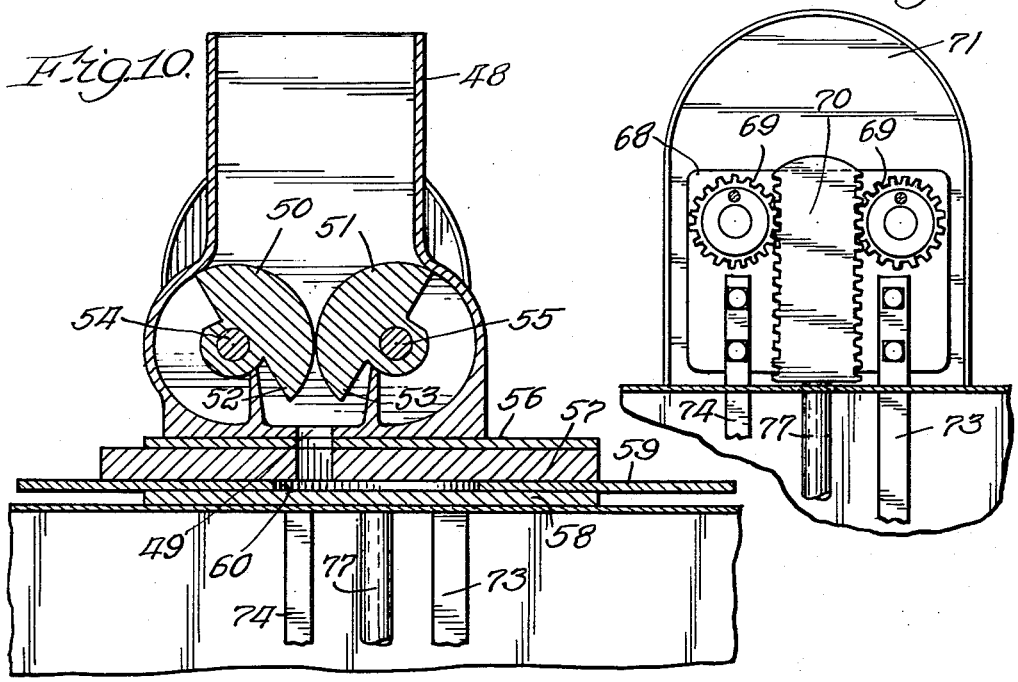

3,061,872
MOLDING DEVICE
Harry H. Holly, Olympia Fields, Ill., assignor to Hollymatic Corporation, a corporation of Illinois
Filed Mar. 31, 1959, Ser. No. 803,212
18 Claims. (Cl. 17—32)

This invention relates to a device for molding a plastic material such as ground meat to form articles such as meat patties.

One of the features of this invention is to provide an improved device for molding articles of plastic material comprising a hopper for the plastic material having an exit opening, a movable feeder in the hopper having a feeder portion, a continuously rotatable member having a motion imparting track therein and an operating member operably engaging the track and operably engaging the feeder for feeding movement upon rotation of the rotatable member.

A further feature of the invention is to provide an improved device for molding articles of plastic material comprising a hopper for the material having an exit opening, a rotatable mold having a plurality of mold openings therein adapted to receive material in series from the hopper through the exit opening as the mold is rotated, a continuously rotatable member, and means periodically operatively connecting the continuously rotatable member and mold for intermittent operation of the mold during continuous operation of the rotatable member to move one of the openings out of communication with the exit and move the next opening into communication with the exit.

A further feature of the invention is to provide such a device wherein releasable brake means are provided for holding the rotatable mold plate substantially motionless during the period when the material is being fed through the exit opening into the mold opening and means operatively associated with the rotatable member for periodically releasing the brake means to permit movement of the mold plate.

Yet another feature of the invention is to provide an improved device having any of the above-mentioned features and improved means for removing a molded portion of the plastic material from a mold opening.

Another feature of the invention is to provide an improved device having any of the above features in which improved means are provided for applying individual separator sheets to the portion of material in the mold opening prior to the time that this portion is removed from the mold opening.

Other features and advantages of the invention will be apparent from the following description of one embodiment thereof taken in conjunction with the accompanying drawings. Of the drawings:

FIGURE 7 is a sectional plan view taken substantially along line 7—7 of FIG. 1;

FIGURE 9 is a sectional elevational view taken substantially along line 9—9 of FIG. 7;

FIGURE 10 is a sectional elevational view taken substantially along line 10—10 of FIG. 8;

FIGURE 11 is a sectional elevational view taken substantially along line 11—11 of FIG. 8; and FIGURE 12 is a sectional elevational view taken substantially along line 12—12 of FIGURE 7.

Figure 1:
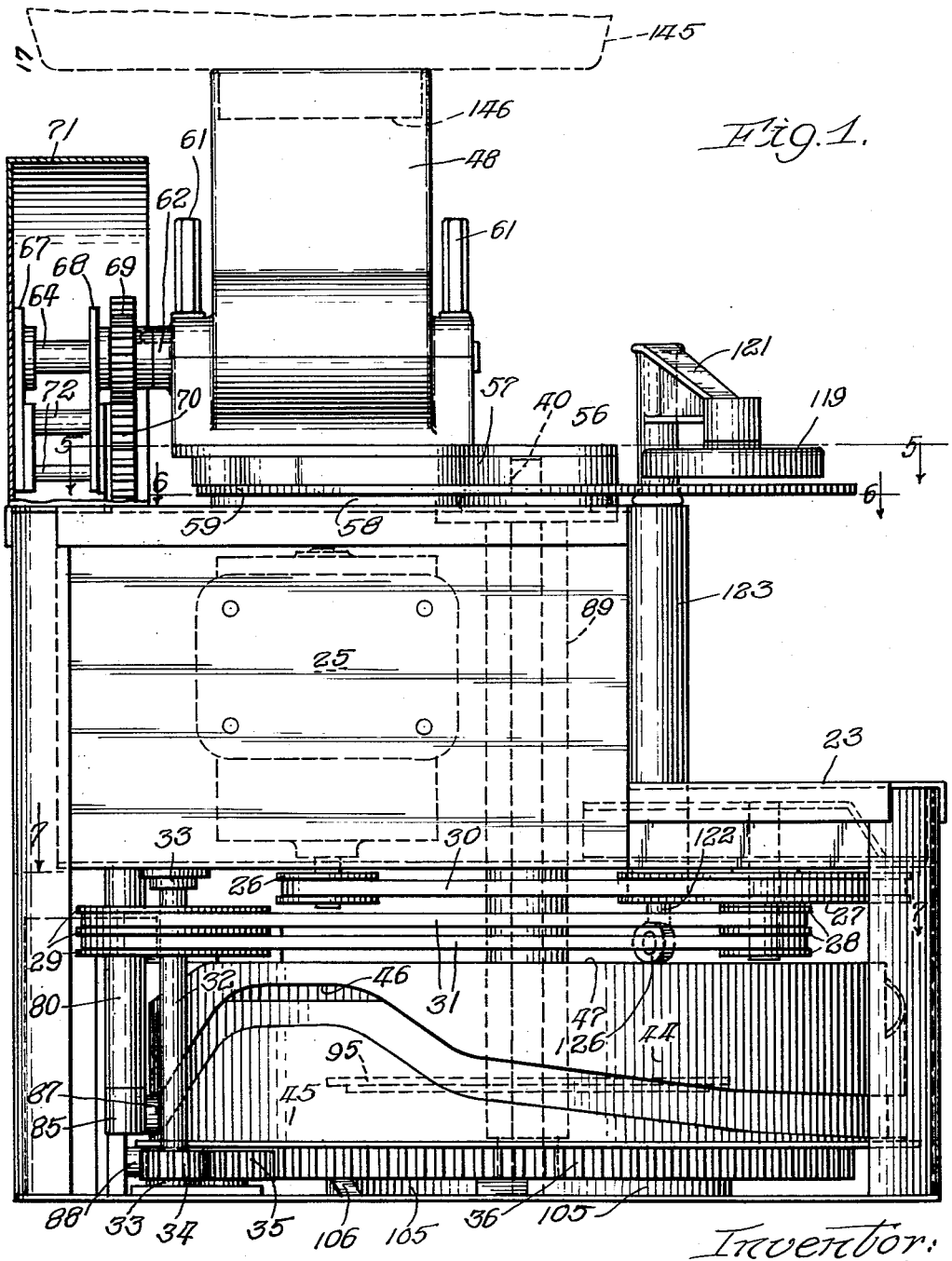
FIGURE 1 is a side elevational view of one embodiment of the invention partially broken away for clarity of illustration.

The device of this invention as shown in the illustrated embodiment comprises a base plate 20 and side plates 21 with one side plate 22 of lower height than the other side plates to provide a receiving shelf 23 for the reception of formed patties in a manner described hereinafter. There is also provided an upper plate 24 so that the combination of the plates constitute the enclosing sides of the device.

Mounted within these enclosing sides is a vertically arranged motor 25 which drives a series of pulleys 26, 27, 28 and 29 and belts 30 and 31 to constitute reduction means to reduce the speed of the motor. The final set of pulleys 29 rotate a shaft 32 that is vertically mounted in bearings 33. The lower end of the shaft 32 is provided with a gear 34.

The gear 34 engages a second larger gear 35 which in turn engages a large gear 36. This large gear 36 is attached to the bottom of a rotatable member 37 which includes a substantially circular bottom plate 38 and an upstanding cylinder 39. The gear 36, plate 38 and cylinder 39 are arranged concentrically about an axis of rotation. At this axis of rotation there is located an upstanding rod 40 attached to the base plate 20 as by a screw 41. The bottom plate 38 and attached gear 36 and cylinder 39 is rotatable about this rod 40 on a lower bearing 42. Attached to the outer surface of the cylinder 39 and spaced therefrom as by a plurality of spacers 43 are a pair of metal plates 44 and 45 having the lower edge of the upper plate 44 spaced from the upper edge of the lower plate 45 to provide a first cam track 46. The upper edge of the upper plate 44 is itself contoured to provide a second cam track 47.

Located at the top of the device and above the top plate 24 is a hopper 48 for holding a supply of plastic material such as ground meat to be molded. The hopper 48 is provided with a bottom exit opening 49. Arranged on either side of the exit opening 49 are a pair of feeders 50 and 51. Each feeder includes a ram portion 52 and 53 movable toward and away from the opening 49 to feed plastic material therethrough. The feeders 50 and 51 are mounted on shafts 54 and 55 that are oscillatable with the feeders. Similar feeders and their operation are described in my prior Patent 2,530,061.

The hopper 48 is mounted on a base plate 56 which in turn is mounted on an adapter plate 57. This adapter plate 57 is held spaced from a lower plate 58 so that a rotatable mold plate 59 may be rotated between the adapter plate 57 and the lower plate 58. The mold plate 59 has four mold openings 60 extending therethrough with the centers of the mold openings being spaced approximately 90° apart. The hopper 48 is held in position by means of four corner threaded posts 61.

One end of a shaft 54 is connected by means of a coupler 62 to an aligned shaft 64. Similarly, the corresponding end of the other feeder shaft 55 is coupled by means of a coupler 65 to an aligned shaft 66. The shafts 64 and 66 are rotatable in bearings held in bearing plates 67 and 68 that are essentially parallel to each other. Mounted on the ends of the short shafts 64 and 66 that are adjacent to the feeder shafts 54 and 55 are a pair of spaced gears 69. These gears are located outside the bearing plate 68. The gears 69 operate as pinion gears and engage the opposite sides of a rack gear 70 having gear teeth on the opposite sides thereof. The shafts 64 and 66, couplers 62 and 65, bearing plates 67 and 68, gears 69 and rack gear 70 are enclosed by a cover 71. The lower ends of the bearing plates 67 and 68 are connected by members 72 and the assembly is supported at least in part by spaced vertically extending bars 73 and 74.

These bars extend down to the bottom of the device and are attached to a vertically extending channel member 75 which carries a guide plate 76.

Figure 8:
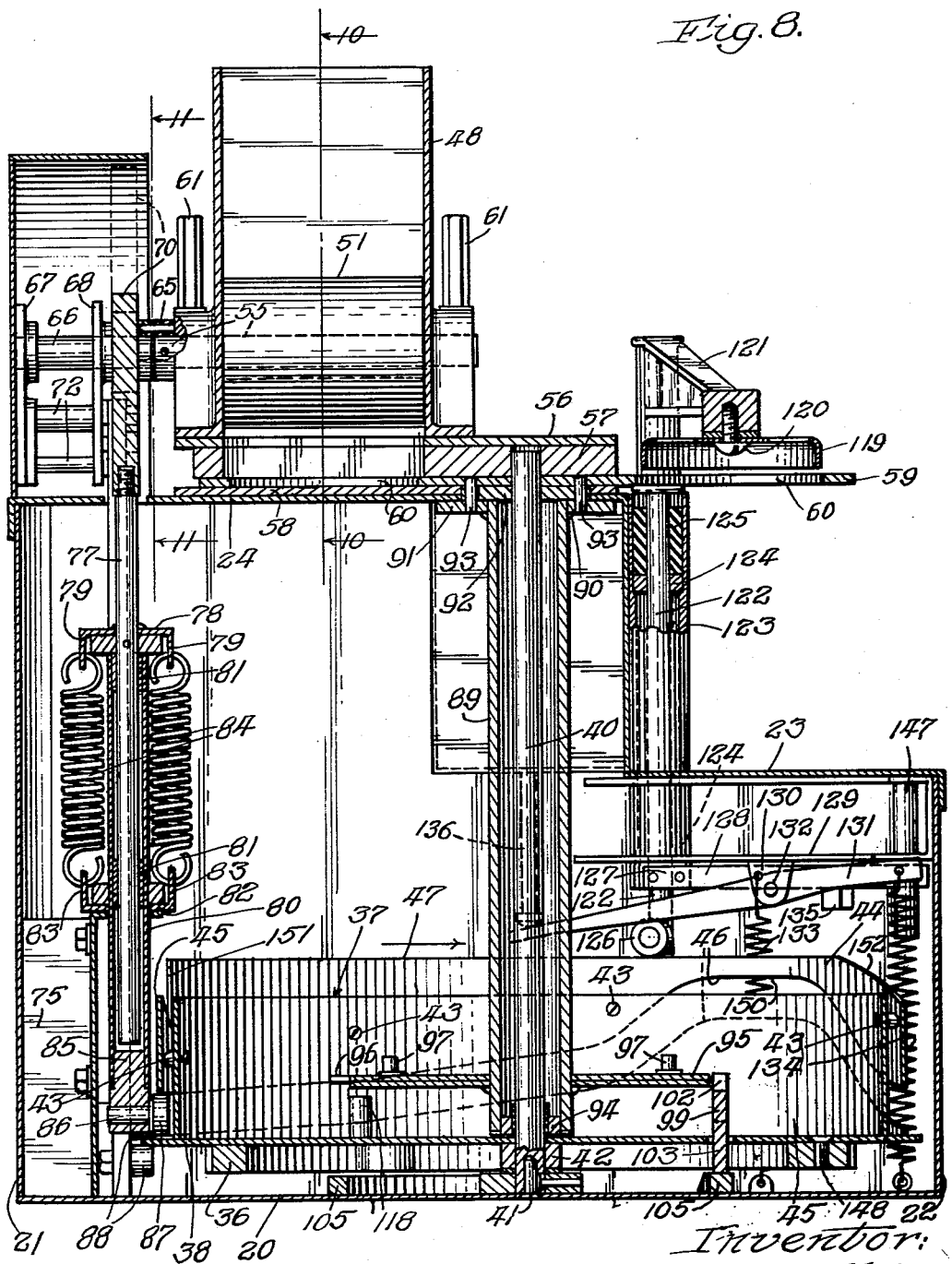
FIGURE 8 is a sectional elevational view taken substantially along line 8—8 of FIG. 2.

Attached to the rack gear 70 for movement thereof is a vertically extending shaft 77. This shaft has attached thereto a transverse, elongated bracket 78 having downwardly extending parallel flanges 79. The lower end of the shaft 77 beneath the bracket 78 is telescopically received within a pipe 80 for sliding movement therein in spaced bearings 81. This pipe 80 is similarly provided with a bracket 82 having similar flanges 83. The brackets 78 and 82 are similar and are parallel to each other and the side flanges 79 face the side flanges 83. Extending between the corresponding flanges 79 and 83 are a plurality of helical springs here shown as eight with four being on each side of the shaft 77. These springs 84 serve to urge the brackets 78 and 82 and thus the shaft 77 and pipe 80 toward each other as illustrated in FIGURE 8. When the assembly of shaft 77 and pipe 80 has its minimum length as illustrated in this figure, the bracket 78 bears against the adjacent end of the pipe 80 and thereby function as a pair of abutments.

The bottom of the pipe 80 is provided with a block 85 carrying in its lower end a transverse shaft 86 which rotatably supports a roller 87. This roller 87 is positioned within the first cam track 46 and thus operates as a cam follower. Located adjacent the cam follower roller 87 is a pair of vertically spaced rollers 88 between which the edge of the bottom plate 38 moves. These vertically spaced rollers 88 serve to support the plate in the region of the cam follower 87.

The upper end of the rod 40 at the center of the device engages a forward end of the adapter plate 57 as shown in FIGURE 8. Thus the rod serves as a support for this end. The mold plate 59 is rotatable around this rod 40. The mold plate is attached to a tube 89 which is used to rotate the mold plate. This tube is coaxial with the mold plate and with the rod 40. This tube 89 which extends beneath the upper plate 24 to a point just short of the bottom plate 38 has its upper end attached as by welding 90 to a disc 91. The disc 91 is connected to a second disc 92 and to the mold plate 59 by a pair of pins 93. The second disc 92 is located within a common opening extending through the upper plate 24 and the plate 58. With this arrangement tube 89, discs 91 and 92 and mold plate 59 rotate as a unit.

The tube 89 is provided at its bottom with a bearing block 94 which embraces a bottom portion of the rod 40 for rotation therearound. Attached to the tube 89 adjacent to the bottom thereof is a transverse member 95 operating as a crank. This member 95 is a substantially circular plate arranged transverse to the tube 89 and coaxial therewith and is provided with four peripheral projections 96 that are substantially coplanar with the plate 95 and whose centers are spaced approximately 90° apart. Mounted on the plate 95 are four upwardly extending pins 97 also spaced approximately 90° apart.

Mounted beneath the plate 95 on the rotatable bottom plate 38 is a catch means 98, here shown as an arm 99 fulcrumed at one end about a fulcrum pin 100 held in a bracket 101 on the plate 38. The arm 99 is arranged for vertical movement about the pin 100 and has an upwardly extending spur 102 that is located adjacent to the periphery of the plate 95 and a downwardly extending cam follower 103 that extends downwardly through an opening 104 in the plate 38. Immediately beneath the circular path of travel of the cam follower 103 are a pair of diametrically oppositely spaced arcuate cams 105, each of which extend a little over 90°. Each cam 105 has a leading sloped riser portion 106 and a following elongated flat dwell portion 107. As is shown, for example, in FIGURE 12, when the arm 99 has been raised by the cam follower portion 103 travelling on the dwell portion 107 of a cam 105, the spur 102 is projected upwardly to engage a projection 96 for rotating the plate 95 and the mold plate 59 by means of the tube 89.

In order to hold the mold plate substantially stationary while a mold opening is being filled with plastic material, brake means are provided. This brake means includes a substantially horizontal arm 108 connected at one end to one end of an inverted U-shaped member 109, the the opposite sides of which are arranged on opposite sides of the cylinder 39 and plates 44 and 45. The end of the member 109 outside these plates is hingedly connected to channel member 75 by means of a hinge pin 110 extending between parallel brackets 111 and passing through a cylinder 112 which is attached to the member 109. With this arrangement the brake arm 108 is movable in a horizontal plane.

The brake arm 108 is provided on its edge that is adjacent to the plate 95 with a notch 113 that is adapted to engage a brake pin 97 under the urging of a spring 114. This spring 114 extends between a bracket 115 on the channel 75 and the inverted U-shaped member 109 at a point above the upper cam plate 44. In order to release the brake during rotation of the mold plate the outer end of the brake arm 108 opposite to the hinge is provided with an angle member 116 attached to this end of the brake arm 108. The angle member 116 has a downwardly extending flange 117 and the member 116 is arranged beyond the plate 95 and substantially parallel to a tangent to this plate. Located to engage the downwardly extending flange 117 during rotation of the bottom plate 38 are a pair of brake release pins 118 that are located approximately 180° apart. As is shown most clearly in FIGURE 7, during rotation of the plate 38 a release pin 118 will engage the flange 117 to move the brake arm 108 away from the plate 95 and disengage the notch 113 from a brake pin 97. This movement will, of course, be against the urging of the spring 114.

In order to remove formed patties from the mold openings 60 there is provided a knock-out member here shown as an inverted circular cup 119 attached as by means of a screw 120 to the end of an arm 121 overhanging the mold plate 59. When the mold plate 59 is stationary, the member 119 is located over a mold opening with the sides of this member spaced slightly inwardly of the sides of the opening.

The arm 121 is attached to the upper end of a rod 122 which is mounted for vertical reciprocation within a tube 123. This tube 123 contains spaced bearings 124 for the rod 122 and also contains a block of resilient material such as rubber 125 for absorbing the shock of the descending knock-out member. The bottom end of the rod 122 carries a roller 126 which rides on the second cam track 47 at the top of the upper cam plate 44.

Attached to the bottom of the rod 122 beneath the tube 123 by means of a bracket 127 is an outwardly extending bar 128. This bar is located beneath a horizontal plate 129. The plate 129 is provided with a pair of downwardly extending parallel brackets 130 between which is fulcrumed a lever 131. This lever is elongated and is movable in a vertical plane about a hinge pin 132 that extends between the bracket 130. The bar 128 and thus the rods 122 and knock-out ring 119 is urged in a downward direction by means of a spring 133.

One end of the lever 131 is attached to a spring 134 which urges the lever 131 in a clockwise direction as viewed in FIGURE 8. The end of the lever 131 to which the spring 134 is attached is normally held raised by means of a crossbar 135 which is attached to the bar 128 for movement therewith and which bears against the bottom of lever 131.

The end of lever 131 opposite to the end to which the spring 134 is attached extends beneath and engages the lower end of a vertically movable lift rod 136. The lift rod 136 is arranged for vertical movement in a bearing structure 137 that extends upwardly from the shelf 23.

The upper end of the lift rod 136 beyond the bearing structure 137 carries a substantially horizontal platform 138 that is reciprocable vertically within the side guide walls 139 and 140. The platform 138 is adapted to hold a stack of individual paper separator sheets (not shown) that are applied one at a time by raising the platform 138 until the topmost sheet contacts the bottom of a patty within an overlying mold opening 60. Similar stacks of separator sheets are shown in my previous patents of which one example is Patent 2,684,501.

Located immediately adjacent the vertical path of travel of the paper-supporting platform 138 is a holder 141 made of a pair of flat metal strips 142 and including a vertical portion, downwardly and outwardly inclined portion 143 and an upwardly extending portion 144 at substantially right angles to the portion 143. The holder 141 is for retaining a stack of separator sheets preparatory to placing them on the platform 138 as soon as the sheets on this platform have been used up.

Figure 4:
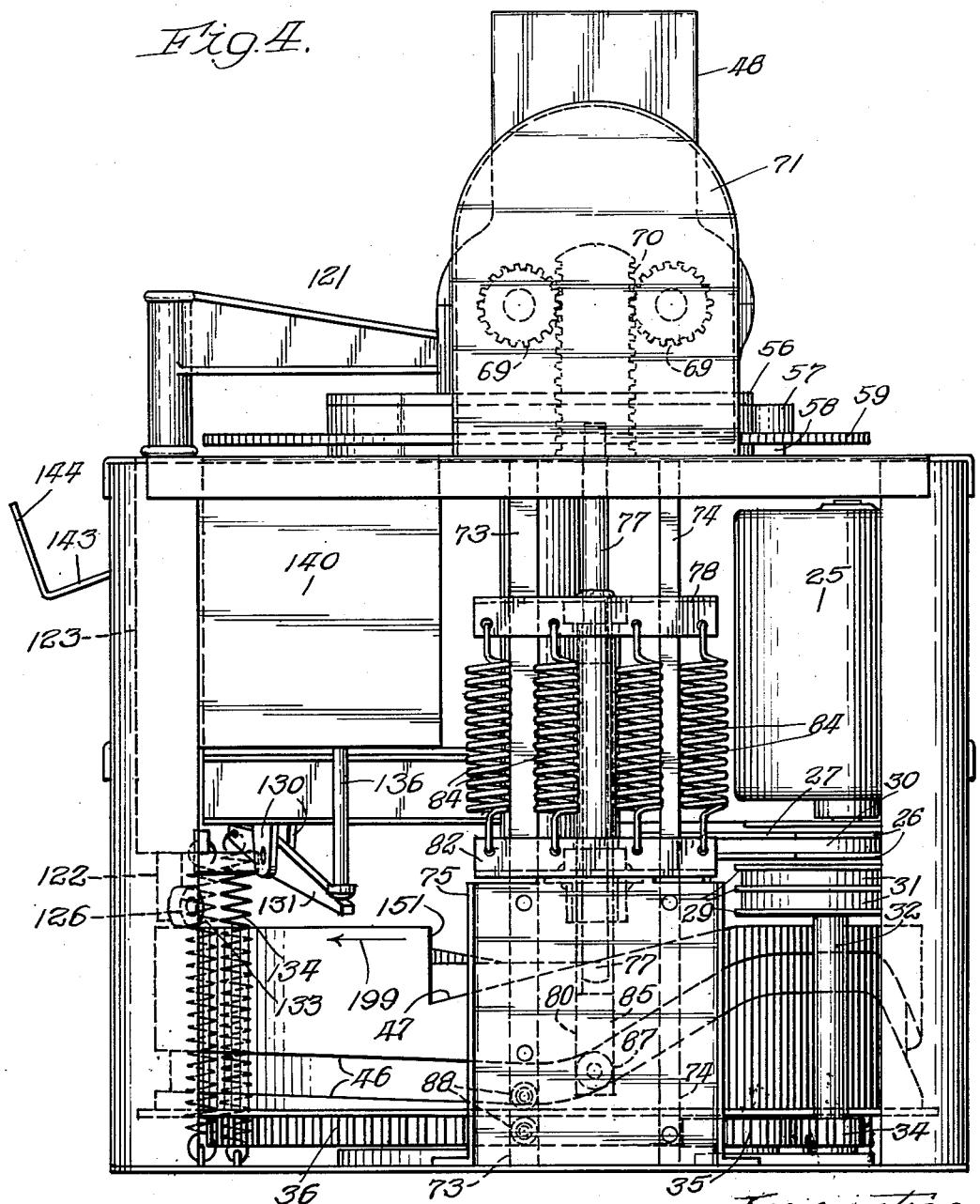
FIGURE 4 is a side elevational view taken from the left-hand side of FIGURE 1.

In order to aid in feeding plastic material such as ground meat into the hopper 48 there is provided a tray 145 having a downwardly extending hollow portion 146 adapted to be telescopically received within the top of the hopper 48 in the manner shown in FIGURE 4.

In order to maintain the path of movement of the bar 128 essentially vertical the end of this bar that is opposite the tube 123 is arranged between parallel spaced guide posts 147. The operation of the device is as follows: The base plate 38 and the attached cylindrical cam plates 44 and 45 is rotated continuously by the motor 25 through the series of belts and pulleys, the shaft 32 and the gears 34 and 35 with the gear 35 rotating the large circular gear 36 that is attached to the bottom of the base plate 38 as by means of the screws 148. The rotating plate 38 carries with it the vertically movable arm 99 which is fulcrumed at 110. The downwardly projecting cam follower 103 slides along the top surface of the base 20 until it reaches the riser portion 106 of one of the two cams 105. At this point the arm 99 is raised to the position shown in FIGURE 12 so that the spur 102 is raised to the level of a projection 96 on the plate or crank member 95. This engagement of the spur 102 with the projection 96 then causes rotation of the plate 95 for 90° at which point the cam follower 103 drops back down onto the top of the plate 20, thereby disengaging the spur 102 from the projection 96. As the driven plate 38 is continuously rotated, the catch member arm 99 is moved another 90° while the crank member plate 95 remains stationary. Then the following cam 105 again engages the cam follower 103 to raise the arm 99 and engage the next projection 96 for rotating the crank member plate 95 another 90°. Thus for each 360° rotation of the driven plate 38, the crank member plate 95 rotates 180° in two 90° increments.

Figure 5:
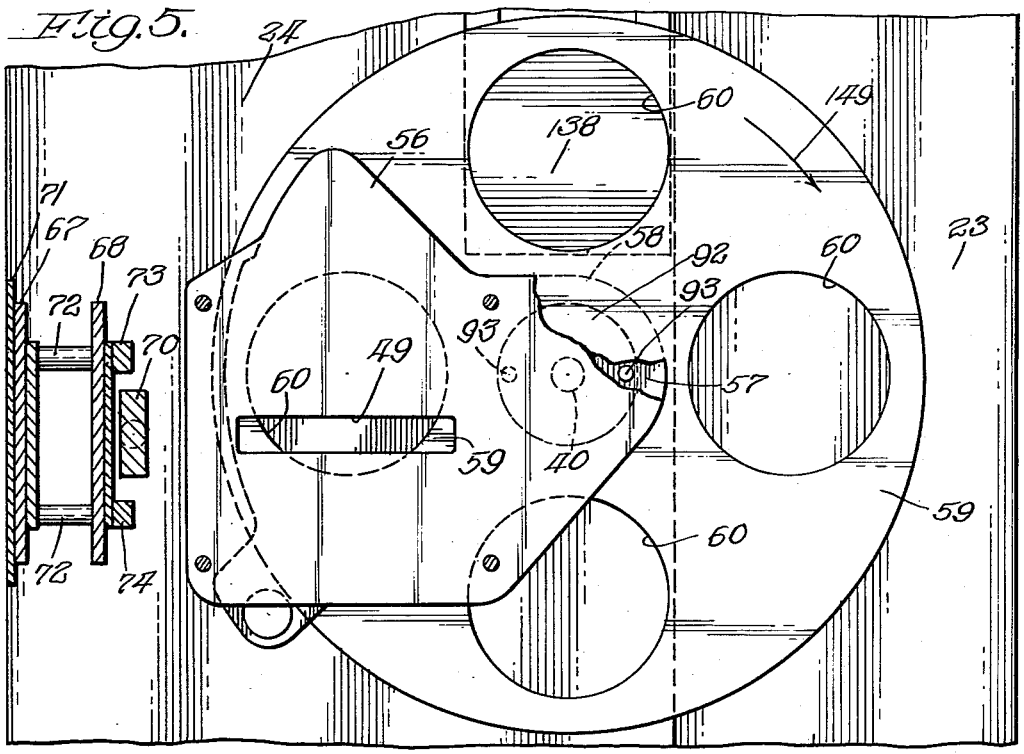
FIGURE 5 is a sectional plan view, partially broken away, taken substantially along line 5—5 of FIGURE 1.
Figure 6:
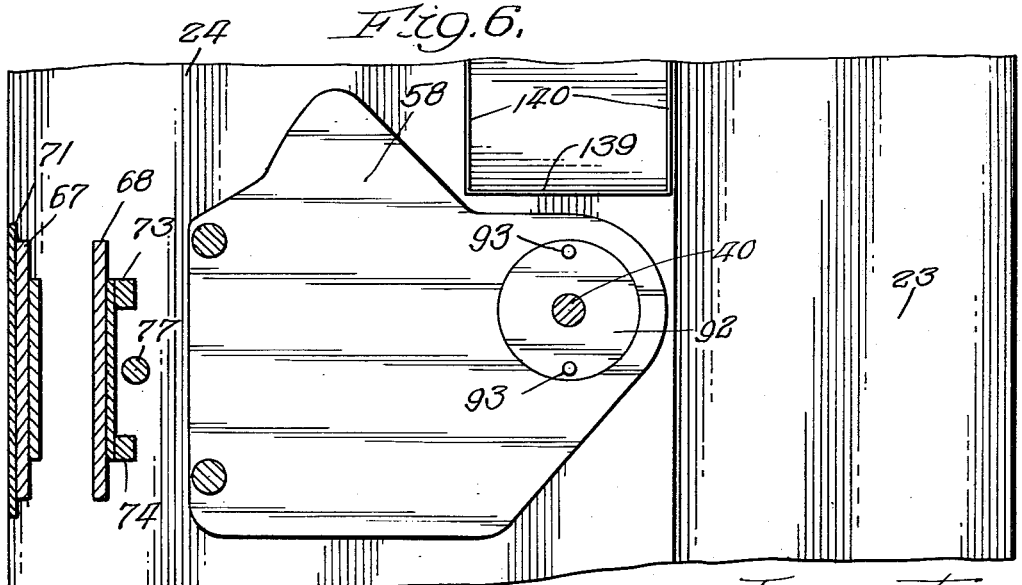
FIGURE 6 is a sectional plan view taken substantially along line 6—6 of FIG. 1.

This intermittent rotation of the crank member plate 95, 90° at a time, turns the attached tube 89 and mold slate 59 in 90° increments. These 90° movements serve to bring one mold opening 60 from beneath the hopper 48 where it has received a charge of plastic material such as ground meat through the exit opening 49 to a position over the stack of separator sheets on the vertically movable platform 138 and to move the mold opening with its contained patty from over the platform 138 to a position diametrically opposite the hopper 48 and beneath the knock-out member 119. These relative positions are illustrated in FIGURES 5 and 8. Thus at all times during operation of the device there will be one mold opening 60 beneath the hopper 48 and the hopper exit opening 49, a next mold opening above the separator sheet platform 138 with this mold opening also containing a patty and a next mold opening 60 in position for the patty to be knocked therefrom by downward movement of the knock-out member 119. The mold plate 59 is moved in 90° increments so that the mold can pause with the various mold openings in these positions in order that the device will have time to fill the mold opening beneath the hopper 48, to apply a separator sheet to the patty in the opening above the platform 138, and to remove the patty and separator sheet from the mold opening beneath the knock-out member 119. The manner in which the plastic material is forced into the mold opening 60 beneath the hopper 48, the separator sheet is applied, and the patty with the separator sheet applied to the bottom of the patty is removed will be explained hereinafter.

At the end of each of the above described 90° increments of movement the mold plate 59 is held motionless in the following manner. At the end of each 90° movement, the brake arm 108 which is urged toward the tube 89 at all times by the spring 114 engages a brake pin 97 on the plate 95. The portion of the arm 108 that engages the brake pin 97 is a notch 113 in the leading edge of the brake arm as shown in FIGURE 7. When this notch engages a pin 97 the mold plate 59 is held motionless in the above described position. As previously described, the driven plate 38 continues to rotate. Mounted on this plate, adjacent the crank member plate 95, are a pair of brake release pins 118 positioned 180° apart about the axis of rotation of the plate 38. Rotation of the plate 38 causes one of these pins 118 to engage the flange 117 on an angle member 116 as shown in FIGURE 7 and move the brake arm 108 in a clockwise direction as shown in this figure about the hinge 112 to release the brake pin 97. The plate 95 and thus the mold 59 are then free to move another 90° increment when the next succeeding brake pin 97 is moved into position to be engaged by the brake arm notch 113. The plate 38, crank member plate 95 and mold plate 59 move in the direction indicated by the arrows 149.

During the continuous rotation of the driven plate 38, the roller 87 or cam follower travels in the first cam track 46 formed by the adjacent edges of the cam plates 44 and 45. The engagement of the cam follower 87 with the cam track 46 causes the pipe 80 and associated telescoped shaft 77 to be reciprocated in a vertical direction. Upward movement of the pipe 80 raises the shaft 77 by reason of the upper end of the pipe engaging the bottom surface of the upper cross bracket 78 on the shaft 77. This raising motion raises the rack gear 70 to rotate the two opposite gears 69 which thereupon open the feeders 50 and 51 from the positions shown in FIGURE 10. In other words, the feeders 50 and 51 are rotated until the ram portions 52 and 53 are moved away from the exit opening 49. In FIGURE 10 these ram portions are shown at their closest point to the exit opening 49 as the cam follower 87 is at the lowest point on the cam track 46. This is the position shown in FIGURE 8. When the cam follower 87 has been moved vertically to the highest point 150 on the cam track 46, the gear 70 will have been moved upwardly to open the feeders 50 and 51 to their fullest extent. The rotation of the driven plate 38 therefore causes the feeders 50 and 51 to be oscillated on their shafts 54 and 55 to feed material through the opening 49 into a mold opening 60. As is shown in my prior patent 2,706,830, the feeders are arranged to open relatively slowly and close rapidly and these operations are brought about by the slope of the cam track 46 as illustrated in FIGURE 8.

The plurality of springs 84 connecting the shaft 77 and the pipe 80 cause a substantially constant force to be exerted by the feeders 50 and 51 on the plastic material within the hopper 48. Thus on downward movement of the pipe 80 any excessive resistance to flow of the plastic material from the hopper 48 through the exit opening 49 causes the pipe 80 to be pulled away from the bracket 78 on the shaft 77 so that the entire downward force on the shaft is through the springs 84. The resistance of these springs 84 will be the maximum force that can be applied to the plastic material being fed through the opening 49. This force can, of course, be regulated by the choice of the number of springs 84 and the tension of the springs.

As mentioned previously a patty within a mold opening 60 is removed from this opening when the mold plate 59 has been rotated 180° to move a given mold opening 60 from beneath the hopper 48 to a position beneath the knock-out member 119. At this point the cam follower 126 which has been riding on top of the second cam track 47 formed by the upper edge of the upper cam plate 44 drops down at the cam portion 151. This drops the rod 122 and the attached knock-out ring 119 so that the ring 119 enters the mold opening 60 beneath the ring to remove the patty therefrom. The patty then falls onto the shelf 23 of the device as illustrated in FIGURE 8.

Figure 2:
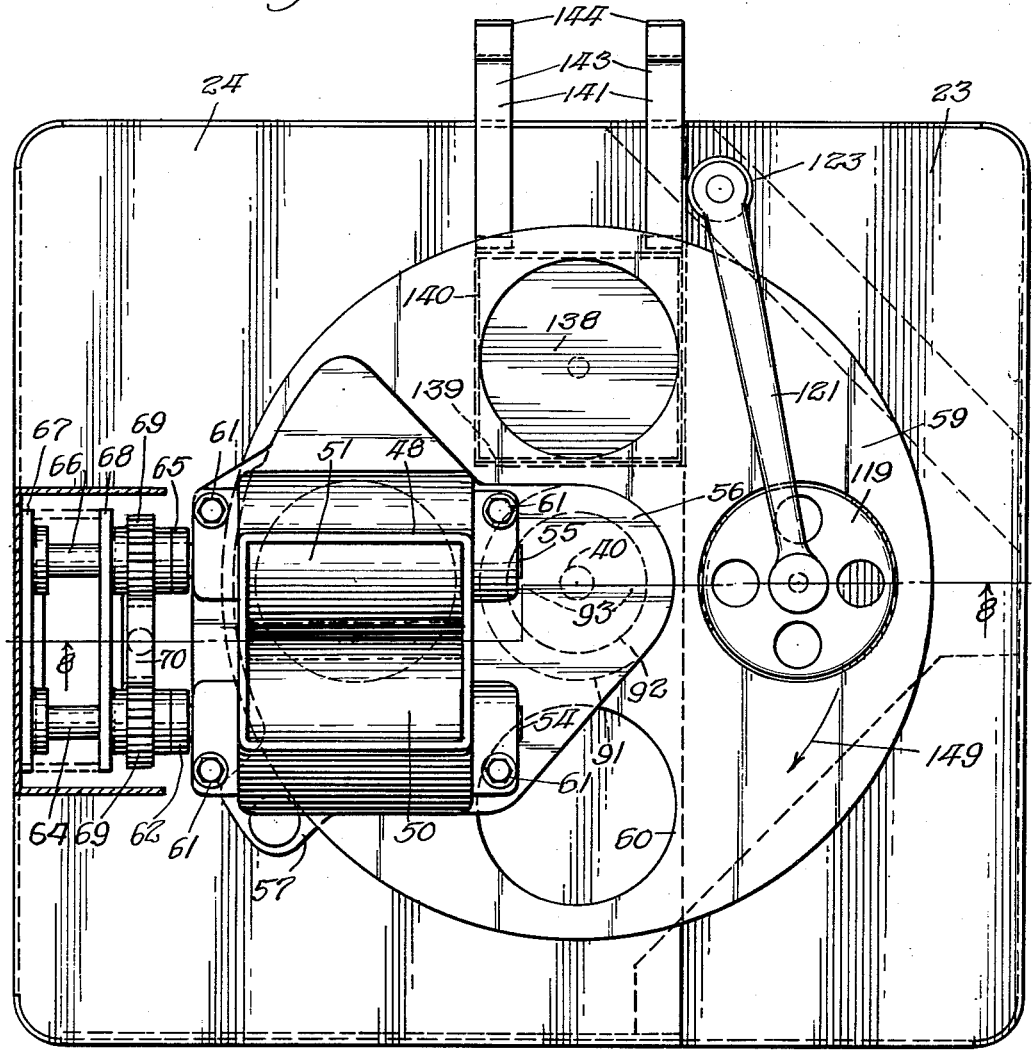
FIGURE 2 is a plan view of the device partially broken away for clarity of illustration.
Figure 3:
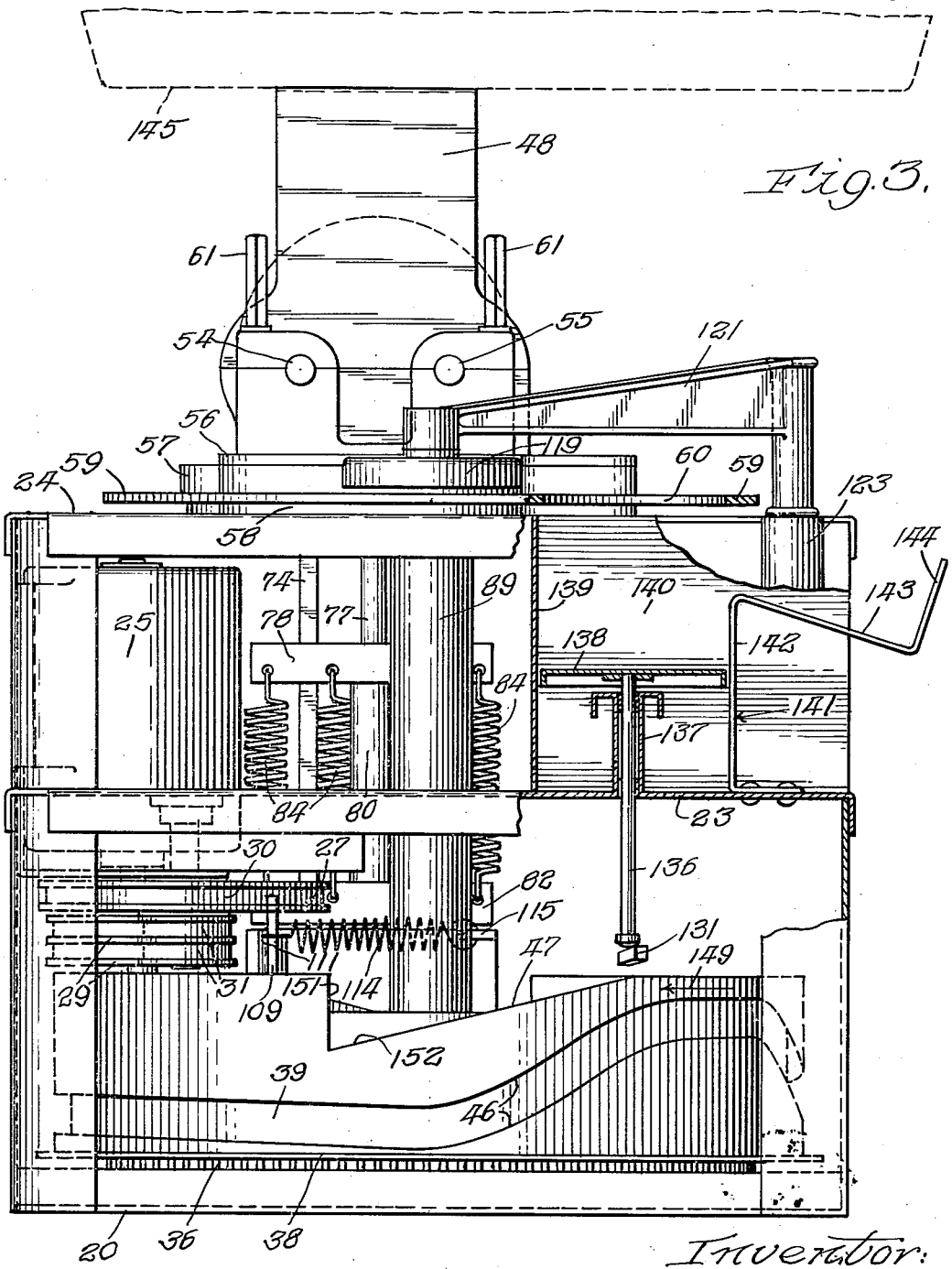
FIGURE 3 is a side elevational view taken from the right-hand side of FIGURE 2 and having a portion in sectional elevation.

Before the patty in an opening 60 reaches the position beneath the knock-out ring 119, it has first been moved 90° from beneath the hopper 48 to a position above the paper supporting platform 138 as shown in FIGURE 2. In this position, a paper separator sheet (not shown) from a stack of such sheets on the platform 138 is applied in the following manner. Upward movement of the rod 122 caused by the cam follower roller 126 riding on the cam 47 in the position shown in FIGURE 8 raises the bar 128 that is attached to the rod 122 and this raises the right-hand end of lever 131 brought about by engagement of the crossbar 135 with the bottom of this end of the lever, all as shown in FIGURE 8. This movement of the lever lowers the lift rod 136 and attached platform 138 to the positions shown in FIGURE 3. Then as the driven plate 38 continues to rotate, which of course also rotates the cam plate 47, the roller cam follower 126 falls from the cam portion 151. This abruptly lowers the crossbar 135 which permits the spring 134 that is attached to the right-hand end of the lever 131 as shown in FIGURE 8 to turn this lever in a clockwise direction, as shown in this figure. This raises the left-hand end of the lever 131 and the lift rod 136 and platform 138 to forcibly apply the topmost sheet of a stack of separator sheets (not shown) on the platform 138 against the bottom of the patty in the mold opening 60 that is above this platform. Then when the lift rod 136 and attached platform 138 are lowered by engagement of the cam follower roller 126 with the upwardly inclined cam portion 152, the crossbar 135 is raised to lower the left-hand end of lever 131 as shown in FIGURE 8 and lower the lift rod 136 and platform 137 to the positions shown in FIGURE 3.

Thus it can be seen that the continuous rotation of the plate 38 which is driven by the motor operates all of the sub-assemblies of the device. The rotation of this plate causes intermittent 90° rotation of the mold plate 59 at an over-all rate that is one-half the rate of the continuously rotating driven plate 38. At the same time the cam track 46 causes reciprocation of the feeders 50 and 51 to feed plastic material, such as ground meat, through the exit opening 49 into a mold plate opening 60. At the same time a filled opening 60 beneath the hopper 48 is moved from beneath the hopper to a position above the paper support platform 138. In this position, a sheet of separator paper is applied to the bottom of the patty where it sticks by the natural adhesiveness of the patty. At the same time the next following mold opening is beneath the hopper 48 and is filled with ground meat through the exit opening 49.

After the separator sheet has been applied to the bottom of the patty that is above the platform 138, the mold 59 is thereupon moved another 90° increment to bring the patty and the adhered bottom separator sheet to a position 180° from the hopper 48 and beneath the knock-out member 119. In this position the knock-out ring 119 is snapped sharply downwardly by the spring 133 and the ejected patty falls onto the shelf 23. The successively ejected patties are thereby arranged in a stack on this shelf and are periodically removed. While the patty is moved from above the platform 138 to the position beneath the knock-out member 119, the next succeeding opening that has been itself filled with ground meat is moved from beneath the hopper to a position above the platform 138.

Continued rotation of the mold plate 59 in these 90° increments causes the empty mold opening 60 beneath the knock-out ring 119 to be moved in two increments, first to the position shown at the bottom of FIGURE 5 and then to the position beneath the hopper 48 for again receiving a charge of ground meat or similar plastic material.

As is customary with the molding devices of my prior patents including those mentioned herein, the size and weight of the patties may be governed by the proper choice of a mold plate 59. These mold plates may be thicker or thinner as desired to determine the weight of the patty and may have openings 60 with any configuration desired. So that the spacing between the plates 56 and 58 will always be the same regardless of the thickness of the mold plate 59, the mold plate is assembled in combination with the adapter plate 57. Thus with a thinner mold plate 59, a thicker plate 57 will be used and conversely when a thicker mold plate 59 is used, a thinner adapter plate 57 is used so that the spacing between the plates 56 and 58 is always substantially the same.

Certain of my prior patents generically cover various features of the device illustrated herein. Thus, Patents 2,530,061 and 2,706,830 cover the feeding of the plastic material, Patent 2,684,501 covers the paper feed and Patent 2,787,808 covers the molding device generally.

Having described my invention as related to the embodiment set out herein, it is my intention that the invention be not limited by any of the details of description unless otherwise specified, but rather be construed broadly within its spirit and scope as set out in the accompanying claims.

I claim:
1. A device for molding articles of plastic material, comprising: a hopper for the plastic material having an exit opening; a mold adapted to communicate with said opening; a pair of reciprocable feeders in the hopper each having a ram portion movable toward and away from the opening and toward and away from the other ram portion during reciprocation of the feeders to force material through the opening; a pair of spaced substantially parallel shafts operably associated with the feeders for thusly reciprocating said feeders; spaced gear means mounted on said shafts; a rotatable member rotatable about an axis having an endless cam track extending around said axis; and an operating member having a cam follower portion operably engaging said track and an operating gear means portion extending between and engaging said shaft gear means for reciprocation of the feeders during rotation of said rotatable member.

2. The device of claim 1 wherein said cam track is contoured to move said ram portions away from said opening at a rate that is faster than the rate of movement toward said opening.

3. A device for molding articles of plastic material, comprising: a hopper for the plastic material having an exit opening; a mold adapted to communicate with said opening; a pair of reciprocable feeders in the hopper each having a ram portion movable toward and away from the opening and toward and away from the other ram portion during reciprocation of the feeders to force material through the opening; a pair of spaced substantially parallel shafts operably associated with the feeders for thusly reciprocating said feeders; spaced gear means mounted on said shafts; a rotatable member rotatable about an axis having an endless cam track extending around said axis; an operating member having a cam follower portion operably engaging said track and an operating gear means portion extending between and engaging said shaft gear means for reciprocation of the feeders during rotation of said rotatable member, the cam follower portion and gear means portion being movable relative to each other to vary the overall length of said operating member from a predetermined minimum length; and spring means connecting said cam follower portion and gear means portion.

4. A device for molding articles of plastic material, comprising: a hopper for the plastic material having an exit opening; a mold adapted to communicate with said opening; a pair of reciprocable feeders in the hopper each having a ram portion movable toward and away from the opening and toward and away from the other ram portion during reciprocation of the feeders to force material through the opening; a pair of spaced substantially parallel shafts operably associated with the feeders for thusly reciprocating said feeders; spaced gear means mounted on said shafts; a rotatable member rotatable about an axis having an endless cam track extending around said axis; an operating member having a cam follower portion operably engaging said track and an operating gear means portion extending between and engaging said shaft gear means for reciprocation of the feeders during rotation of said rotatable member, the cam follower portion and gear means portions being telescopically associated and movable relative to each other to vary the overall length of said operating member from a predetermined minimum length; a pair of abutments on said portions in contact with each other at said minimum length; and spring means operatively interconnecting said abutments, the cam track being contoured to move said ram portions away from said opening at a rate that is faster than the rate of movement toward said opening.

5. A device for molding articles of plastic material, comprising: a hopper for the plastic material having an exit opening; a rotatable mold having a plurality of mold openings therein adapted to communicate in series with said exit as the mold is rotated; an operating member coaxial with the mold and attached thereto for rotation therewith; a plate member attached to said coaxial member transverse thereto for rotation with the coaxial member and mold; a continuously rotatable member adjacent said coaxial member and said plate member; catch means pivotally mounted on said rotating member for rotation therewith, said plate member having a plurality of means thereon spaced similarly to the spacing of said mold openings engageable in series by said catch means on movement of the match means in a first direction toward the plate member and disengageable from the catch means on movement of the catch means in a second direction away from the plate member; and means adjacent said rotatable member periodically engaging said catch means for movement thereof in said first direction for intermittent rotation of the mold during continuous rotation of said rotatable member to move one of said openings out of communication with said exit and move the next opening into said communication, and then movement of the catch means in said second direction to disengage the catch means from the plate member means while a mold opening is in communication with said exit.

6. A device for molding articles of plastic material, comprising: a hopper for the plastic material having an exit opening; a rotatable mold having a plurality of mold openings therein adapted to communicate in series with said exit as the mold is rotated; an operating member coaxial with the mold and attached thereto for rotation therewith; a plate member attached to said coaxial member transverse thereto for rotation with the coaxial member and mold; a continuously rotatable member adjacent said coaxial member and said plate member; catch means pivotally mounted on said rotating member for rotation therewith, said plate member being substantially circular and coaxial with said coaxial member and having a plurality of peripheral projections thereon spaced similarly to the spacing of said mold openings engageable in series by said catch means on movement of the catch means in a first direction toward the plate member and disengageable from the catch means on movement of the catch means in a second direction away from the plate member; and cam means adjacent said rotatable member periodically engaging said catch means for movement thereof in said first direction for intermittent rotation of the mold during continuous rotation of said rotatable member to move one of said openings out of communication with said exit and move the next opening into said communication and then movement of the catch means in said second direction to disengage the catch means from the crank member while a mold opening is in communication with said exit.

7. A device for molding articles of plastic material, comprising: a hopper for the plastic material having an exit opening; a rotatable mold having a plurality of mold openings therein adapted to communicate in series with said exit as the mold is rotated; an operating member coaxial with the mold and attached thereto for rotation therewith; a plate member attached to said coaxial member transverse thereto for rotation with the coaxial member and mold; a continuously rotatable member adjacent said coaxial member and said plate member; catch means pivotally mounted on said rotating member for rotation therewith, said plate member being substantially circular and coaxial with said coaxial member and having a plurality of peripheral projections thereon spaced similarly to the spacing of said mold openings engageable in series by said catch means on movement of the catch means in a first direction toward the plate member and disengageable from the catch means on movement of the catch means in a second direction away from the plate member; cam means adjacent said rotatable member periodically engaging said catch means for movement thereof in said first direction for intermittent rotation of the mold during continuous rotation of said rotatable member to move one of said openings out of communication with said exit and move the next opening into said communication; a pair of reciprocable feeders in the hopper each having a ram portion movable toward and away from the opening and toward and away from the other ram portion during reciprocation of the feeders to force material through the opening; a pair of spaced substantially parallel shafts operably associated with the feeders for thusly reciprocating said feeders; spaced gear means mounted on said shafts, said continuously rotatable member having an endless cam track extending around said axis; an operating member having a cam follower portion operably engaging said track and an operating gear means portion extending between and engaging said shaft gear means for reciprocation of the feeders during rotation of said rotatable member, the cam follower portion and gear means portion being telescopically associated and movable relative to each other to vary the over-all length of said operating member from a predetermined minimum length; a pair of abutments on said portions in contact with each other at said minimum length; and spring means operatively interconnecting said abutments, the cam track being contoured to move said ram portions away from said opening at a rate that is faster than the rate of movement toward said opening.

8. A device for molding articles of plastic material, comprising: a hopper for the plastic material having an exit opening; a rotatable mold having a plurality of mold openings therein adapted to communicate in series with said exit as the mold is rotated; a pair of reciprocable feeders in the hopper each having a ram portion movable toward and away from the exit and toward and away from each other during reciprocation of the feeders to force material through the openings; a pair of spaced substantially parallel shafts operably associated with the feeders for thusly reciprocating said feeders; gear means mounted on said shafts; a rotatable member rotatable about an axis having first and second endless cam tracks extending around said axis; an operating member having a cam follower portion operably engaging said first track and an operating gear means portion extending between and engaging said shaft gear means for reciprocation of the feeders during rotation of said rotatable member; and a removing member movable toward a mold opening to remove plastic material therefrom, and then away from said opening, the removing member including a cam follower engaging said second track for causing said movement.

9. A device for molding articles of plastic material, comprising: a hopper for the plastic material having an exit opening; a rotatable mold having a plurality of mold openings therein adapted to communicate in series with said exit as the mold is rotated; a pair of reciprocable feeders in the hopper each having a ram portion movable toward and away from the exit and toward and away from each other during reciprocation of the feeders to force material through the opening; a pair of spaced substantially parallel shafts operably associated with the feeders for thusly reciprocating said feeders; gear means mounted on said shafts; a continuously rotatable member; means periodically operatively connecting said continuously rotatable member and mold for intermittent rotation of the mold during continuous rotation of said rotatable member to move one of said openings out of communication with said exit and move the next opening into said communication, said continuously rotatable member having first and second endless cam tracks extending around said axis; an operating member having a cam follower portion operably engaging said first track and an operating gear means portion extending between and engaging said shaft gear means for reciprocation of the feeders during rotation of said rotatable member; and a knock-out member movable toward a mold opening to remove plastic material therefrom and movable away from the opening to permit said intermittent rotation, the knock-out member including a cam follower engaging said second track for causing said movement.

10. A device for molding articles of plastic material, comprising: a hopper for the plastic material having an exit opening; a mold adapted to communicate with said opening; a pair of reciprocable feeders in the hopper each having a ram portion movable toward and away from the opening and toward and away from the other ram portion during reciprocation of the feeders to force material through the opening; a pair of spaced substantially parallel shafts operably associated with the feeders for thusly reciprocating said feeders; spaced gear means mounted on said shafts; a rotatable member rotatable about an axis having first and second endless cam tracks extending around said axis; an operating member having a cam follower portion operably engaging said first track and an operating gear means portion extending between and engaging said shaft gear means for reciprocation of the feeders during rotation of said rotatable member, the cam follower portion and gear means portion being movable relative to each other to vary the over-all length of said operating member from a predetermined minimum length; spring means connecting said cam follower portion and gear means portion; and a removing member movable toward a mold opening to remove plastic material therefrom, and then away from said opening, the removing member including a cam follower engaging said second track for causing said movement.

11. A device for molding articles of plastic material, comprising: a hopper for the plastic material having an exit opening; a pair of reciprocable feeders in the hopper each having a ram portion movable toward and away from the opening and toward and away from the other ram portion during reciprocation of the feeders to force material through the opening; a pair of spaced substantially parallel shafts operably associated with the feeders for thusly reciprocating said feeders; gear means mounted on said shafts; a rotatable mold having a plurality of mold openings therein adapted to communicate in series with said exit as the mold is rotated; a member coaxial with the mold and attached thereto for rotation therewith; a rotatable member rotatable about an axis having first and second endless cam tracks extending around said axis; an operating member having a cam follower portion operably engaging said first track and an operating gear means portion extending between and engaging said shaft gear means for reciprocation of the feeders during rotation of said rotatable member; means periodically operatively connecting said continuously rotatable member and coaxial member for intermittent rotation of the mold during continuous rotation of said rotatable member to move one of said openings out of communication with said exit and move the next opening into said communication; and a knock-out member movable toward a mold opening to remove plastic material therefrom and movable away from the opening to permit said intermittent rotation, the knock-out member including a cam follower engaging said second track for causing said movement.

12. A device for molding articles of plastic material, comprising: a hopper for the plastic material having an exit opening; a rotatable mold having a plurality of mold openings therein adapted to communicate in series with said exit as the mold is rotated; a reciprocable feeder in the hopper having a ram portion movable toward and away from the exit during reciprocation of the feeder to force material through the opening; a rotatable member rotatable about an axis having an endless cam track extending around said axis; means periodically operatively connecting said continuously rotatable member and mold for intermittent rotation of the mold during continuous rotation of said rotatable member to move one of said openings out of communication with said exit and move the next opening into said communication; a removing member movable toward a mold opening to remove plastic material therefrom, and then away from said opening, the removing member including a cam follower engaging said track for causing said movement; a support member adjacent the mold adapted to support a separator sheet; means urging said support member toward the mold for contacting a separator sheet against a surface of plastic material in one of said mold openings; and means operatively associated with said removing member preventing operation of said urging means except when the removing member is moved toward a mold opening.

13. A device for molding articles of plastic material, comprising: a hopper for the plastic material having an exit opening; a rotatable mold having a plurality of mold openings therein adapted to communicate in series with said exit as the mold is rotated; a reciprocable feeder in the hopper having a ram portion movable toward and away from the exit during reciprocation of the feeder to force material through the opening; a continuously rotatable member; means periodically operatively connecting said continuously rotatable member and mold for intermittent rotation of the mold during continuous rotation of said rotatable member to move one of said openings out of communication with said exit and move the next opening into said communication; a removing member movable toward a mold opening to remove plastic material therefrom, and then away from said opening; means operatively connecting said continuously rotatable member for said movement of the removing member; a support member adjacent the mold adapted to support a separator sheet; means urging said support member toward the mold for contacting a separator sheet against a surface of plastic material in one of said mold openings; and means operatively associated with said removing member preventing operation of said urging means except when the removing member is moved toward a mold opening.

14. A device for molding articles of plastic material, comprising: a hopper for the plastic material having an exit opening; a rotatable mold having a plurality of mold openings therein adapted to communicate in series with said exit as the mold is rotated; a pair of reciprocable feeders in the hopper each having a ram portion movable toward and away from the exit and toward and away from each other during reciprocation of the feeders to force material through the opening; a pair of spaced substantially parallel shafts operably associated with the feeders for thusly reciprocating said feeders; gear means mounted on said shafts; a rotatable member rotatable about an axis having first and second endless cam tracks extending around said axis; an operating member having a cam follower portion operably engaging said first track and an operating gear means portion extending between and engaging said shaft gear means for reciprocation of the feeders during rotation of said rotatable member; a removing member movable toward a mold opening to remove plastic material therefrom, and then away from said opening, the removing member including a cam follower engaging said second track for causing said movement; a support member adjacent the mold adapted to support a separator sheet; means urging said support member toward the mold for contacting a separator sheet against a surface of plastic material in one of said mold openings; and means operatively associated with said removing member preventing operation of said urging means except when the removing member is moved toward a mold opening.

15. A device for molding articles of plastic material, comprising: a hopper for the plastic material having an exit opening; a rotatable mold having a plurality of mold openings therein adapted to communicate in series with said exit as the mold is rotated; a pair of reciprocable feeders in the hopper each having a ram portion movable toward and away from the exit and toward and away from each other during reciprocation of the feeders to force material through the opening; a pair of spaced substantially parallel shafts operably associated with the feeders for thusly reciprocating said feeders; gear means mounted on said shafts; a continuously rotatable member; means periodically operatively connecting said continuously rotatable member and mold for intermittent rotation of the mold during continuous rotation of said rotatable member to move one of said openings out of communication with said exit and move the next opening into said communication, said rotatable member being rotatable about an axis and having first and second endless cam tracks extending around said axis; an operating member having a cam follower portion operably engaging said first track and an operating gear means portion extending between and engaging said shaft gear means for reciprocation of the feeders during rotation of said rotatable member; a knock-out member movable toward a mold opening to remove plastic material therefrom and movable away from the opening to permit said intermittent rotation, the knock-out member including a cam follower engaging said second track for causing said movement; a support member adjacent the mold adapted to support a separator sheet; means urging said support member toward the mold for contacting a separator sheet against a surface of plastic material in one of said mold openings; and means operatively associated with said knock-out member preventing operation of said urging means except when the knock-out member is moved toward a mold opening.

16. A device for molding articles of plastic material, comprising: a hopper for the plastic material having an exit opening; a mold having a cavity means for communicating with said opening; a pair of oscillatable cooperating feeder means in said hopper for forcing the plastic material through said exit opening into said cavity means; spaced oscillating means associated with said feeder means for thusly oscillating the same; a reciprocable drive means engaging both said oscillating means for oscillating the cooperating feeder means on reciprocating said drive means, the drive means including a pair of telescoping parts one of which is spaced from said oscillating means; spring means extending between said telescoping parts; and operating means movable through a fixed path and engaging said one telescoped part.

17. A device for molding articles of plastic material, comprising: a hopper for the plastic material having an exit opening; a mold having a cavity means for communicating with said opening; a pair of oscillatable cooperating feeder means in said hopper for forcing the plastic material through said exit opening into said cavity means; spaced oscillating means associated with said feeder means for thusly oscillating the same; reciprocable drive means passing between and engaging said oscillating means on opposite sides of the drive means for oscillating the cooperating feeder means on reciprocating said drive means, the drive means including a pair of telescoping parts one of which is spaced from said oscillating means; spring means extending between said telescoping parts; and operating means movable through a fixed path and engaging said one telescoped part.

18. A device for molding articles of plastic material, comprising: a hopper for the plastic material having an exit opening; feeder means in said hopper having a feeder portion movable toward and away from said exit opening for forcing plastic material therethrough; reciprocable drive means operatively engaging said feeder means for operation thereof, the drive means having a cam engaging portion; and a rotatable cam having a cam track engaging said cam engaging portion for reciprocating the drive means, the cam track being contoured to move said feeder means away from said opening at a rate that is faster than its rate of movement toward the opening.

References Cited in the file of this patent

UNITED STATES PATENTS

| | | |
|---|---|---|
| 1,384,338 | Powell | July 12, 1921 |
| 1,389,039 | Estes | Aug. 30, 1921 |
| 1,504,726 | Seufert | Aug. 12, 1924 |
| 1,830,004 | Skoverski | Nov. 3, 1931 |
| 1,851,910 | Johns | Mar. 29, 1932 |
| 2,019,202 | Taylor | Oct. 29, 1935 |
| 2,052,734 | Walter | Sept. 1, 1936 |
| 2,366,379 | Bemis | Jan. 2, 1945 |
| 2,482,593 | Palmer | Sept. 20, 1949 |
| 2,579,549 | Cave | Dec. 25, 1951 |
| 2,764,106 | Maickel | Sept. 25, 1956 |
| 2,787,808 | Holly | Apr. 9, 1957 |
| 2,799,044 | Mahan | July 16, 1957 |
| 2,817,200 | Garfunkel | Dec. 24, 1957 |

FOREIGN PATENTS

| | | |
|---|---|---|
| 24,665 | Denmark | June 10, 1919 |